United States Patent
Sahoo

(10) Patent No.: US 11,852,880 B2
(45) Date of Patent: Dec. 26, 2023

(54) OPTICAL FIBER CABLE WITH MOVABLE RIP CORD

(71) Applicant: Sterlite Technologies Limited, Gurugram (IN)

(72) Inventor: Kishore Sahoo, Gurugram (IN)

(*) Notice: Subject to any disclaimer, the term of this patent is extended or adjusted under 35 U.S.C. 154(b) by 0 days.

(21) Appl. No.: 17/700,483

(22) Filed: Mar. 22, 2022

(65) Prior Publication Data

US 2023/0204885 A1   Jun. 29, 2023

(30) Foreign Application Priority Data

Dec. 28, 2021   (IN) .............................. 202111061175

(51) Int. Cl.
G02B 6/44 (2006.01)

(52) U.S. Cl.
CPC .......... *G02B 6/4431* (2023.05); *G02B 6/4432* (2013.01)

(58) Field of Classification Search
CPC ............................ G02B 6/4432; G02B 6/4495
See application file for complete search history.

(56) References Cited

U.S. PATENT DOCUMENTS

2020/0257069 A1 * 8/2020 Benjamin .............. G02B 6/448

FOREIGN PATENT DOCUMENTS

| JP | 2022049246 A | * | 3/2022 | .............. G02B 6/44 |
| JP | 2022067756 A | * | 5/2022 | .............. G02B 6/44 |
| WO | WO-2017061196 A1 | * | 4/2017 | .............. G02B 6/44 |

* cited by examiner

*Primary Examiner* — Ryan A Lepisto
(74) *Attorney, Agent, or Firm* — Steven R. Fairchild

(57) ABSTRACT

An optical fiber cable with movable rip cord is provided. The optical fiber cable (100, 200, 300) comprises a core (110) having one or more optical transmission elements (114), a first layer (106) surrounding the core, a second layer (102) surrounding the first layer, wherein the second layer is relatively harder than the first layer and one or more rip cords (108) placed between the first layer and the second layer such that the one or more rip cords have a degree-of-angular movement less than ±d, wherein d is an angular distance between two consecutive rip cords of the optical fiber cable. The first layer is deformed radially towards a central axis (X) of the optical fiber cable in vicinity of the one or more rip cords, wherein deformation (116) of the first layer is equal to or greater than a diameter of the one or more rip cords.

8 Claims, 3 Drawing Sheets

OPTICAL FIBER CABLE WITH MOVABLE RIP CORD

TECHNICAL FIELD

The present disclosure relates to optical fiber cables, and in particular, relates to an optical fiber cable with movable rip cord(s).

BACKGROUND

Optical fiber cables have secured an important position in building optical network of modern communication systems across the globe. The optical fiber cables are part of millions of miles of the optical network. From mountain regions to shorelines, from remotest villages to urban environment, engineers have installed the optical fiber cables almost in every region for better connectivity and high bandwidth.

Often times, it is necessary to break open (or strip) a jacket/sheath in order to gain access to a core or other elements/component, for example, to connect an optical fiber cable to another optical fiber cable or to a piece of equipment. Rip cords (or ripcords) help in stripping the optical fiber cable. In existing cable designs, a rip cord is embedded in the sheath. Due to which, a part of the sheath, which is below the rip cord, towards the core, does not get stripped.

Accordingly, a prior art reference "U.S. Pat. No. 8,280,209 B2" discloses ripcord placement inside a channel in a sheath. Similarly, another prior art reference "IN201721000660A" teaches ripcord placement between a cable and a duct.

However, the above-mentioned prior arts as well as conventional optical fiber cables do not provide a convincing solution to access the ripcords, hence the core, easily and smoothly. Therefore, specialized tools are required to access the rip cord before stripping the sheath, thereby making a core access process time consuming and cumbersome. In light of the above-stated discussion, there is a need to overcome the above stated disadvantages/problems.

Any references to methods, apparatus or documents of the prior art are not to be taken as constituting any evidence or admission that they formed, or form part of the common general knowledge.

OBJECT OF THE DISCLOSURE

A primary object of the present disclosure is to provide an optical fiber cable with one or more movable rip cords.

Another object of the present disclosure is to provide the one or more movable rip cords in between a flexible surface surrounding a core and a hard surface (inner surface of a sheath).

SUMMARY

Accordingly, an optical fiber cable with one or more movable rip cords is provided. The optical fiber cable comprises a core having one or more optical transmission elements, a first layer surrounding the core, a second layer surrounding the first layer. The second layer is relatively harder than the first layer and comprises one or more strength members embedded in it. The first layer is defined by a first shore D hardness of less than or equal to 20 and the second layer is defined by a second shore D hardness of greater than or equal to 40. The optical fiber cable further comprises one or more rip cords placed between the first layer and the second layer such that the one or more rip cords have a degree of angular movement ($D_f$) less than ±d, wherein d is an angular distance between two consecutive rip cords of the optical fiber cable. The one or more rip cords have the angular movement of less than 180° in 1 meter of the optical fiber cable. Alternatively, the one or more rip cords have the angular movement of less than 45° in 1 meter of the optical fiber cable. A force required for the angular movement of the one or more rip cords is less than 5 N. The first layer is deformed radially towards a central axis (X) of the optical fiber cable, wherein the first layer is deformed in vicinity of the one or more rip cords, wherein deformation of the first layer is equal to or greater than a diameter of the one or more rip cords.

These and other aspects herein will be better appreciated and understood when considered in conjunction with the following description and the accompanying drawings. It should be understood, however, that the following descriptions are given by way of illustration and not of limitation. Many changes and modifications may be made within the scope of the invention herein without departing from the spirit thereof.

BRIEF DESCRIPTION OF FIGURE

The invention is illustrated in the accompanying drawings, throughout which like reference letters indicate corresponding parts in the drawings. The invention herein will be better understood from the following description with reference to the drawings, in which.

It should be noted that the accompanying figures are intended to present illustrations of few examples of the present disclosure. The figures are not intended to limit the scope of the present disclosure. It should also be noted that accompanying figures are not necessarily drawn to scale.

DETAILED DESCRIPTION

In the following detailed description of the invention, numerous specific details are set forth in order to provide a thorough understanding of the invention. However, it will be obvious to a person skilled in the art that the invention may be practiced with or without these specific details. In other instances, well known methods, procedures and components have not been described in detail so as not to unnecessarily obscure aspects of the invention.

Furthermore, it will be clear that the invention is not limited to these alternatives only. Numerous modifications, changes, variations, substitutions and equivalents will be apparent to those skilled in the art, without parting from the scope of the invention.

The accompanying drawings are used to help easily understand various technical features and it should be understood that the alternatives presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Unlike conventional optical fiber cables, the present disclosure proposes an optical fiber cable with one or more movable rip cords, wherein the one or more movable rip cords are positioned in between a flexible surface wrapping a core and a hard surface (inner surface of a sheath), thereby providing an easy and smooth access to the ripcords, hence the core. Further, the proposed disclosure intends to provide freedom from specialized tools to access the rip cord before stripping the sheath, thereby making a core access process less laborious, less time consuming and convenient. Furthermore, the one or more movable rip cords facilitate complete removal of the sheath.

Figure 1:
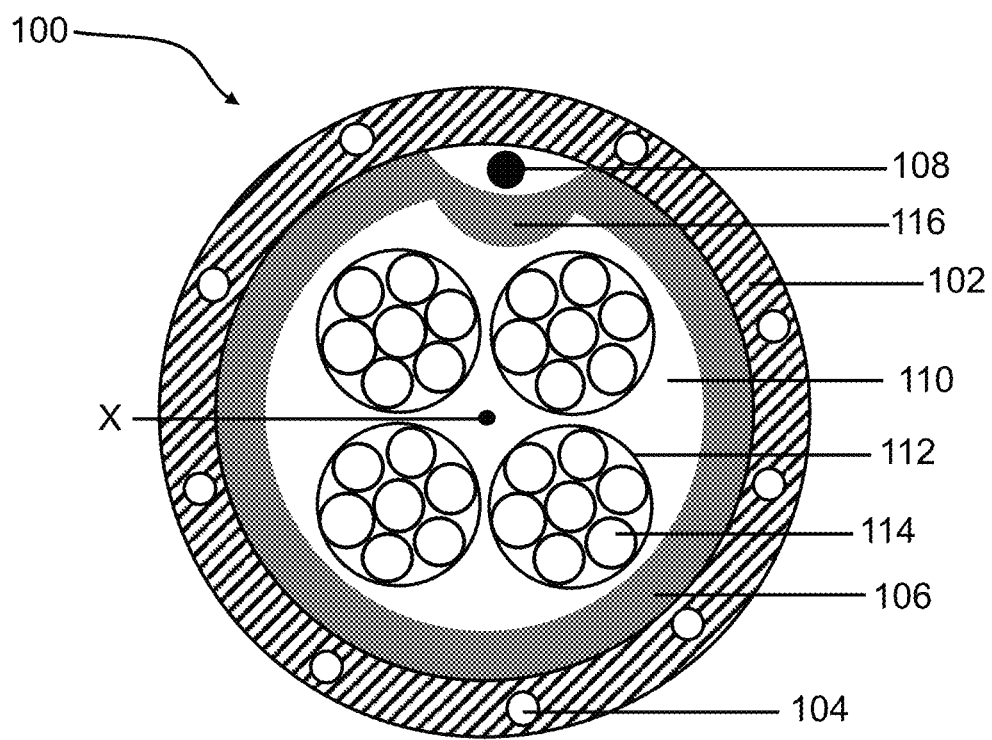
FIG. 1 illustrates an exemplary optical fiber cable with a movable rip cord.
Figure 2:
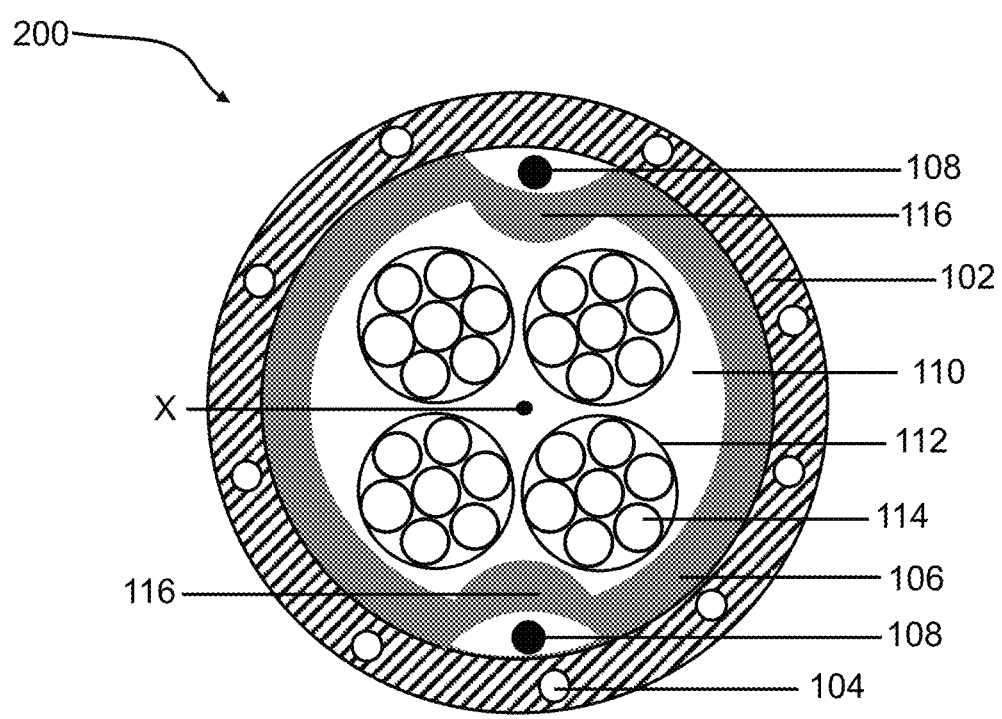
FIG. 2 illustrates an exemplary optical fiber cable with two movable rip cords that are 180 degrees apart.
Figure 3:
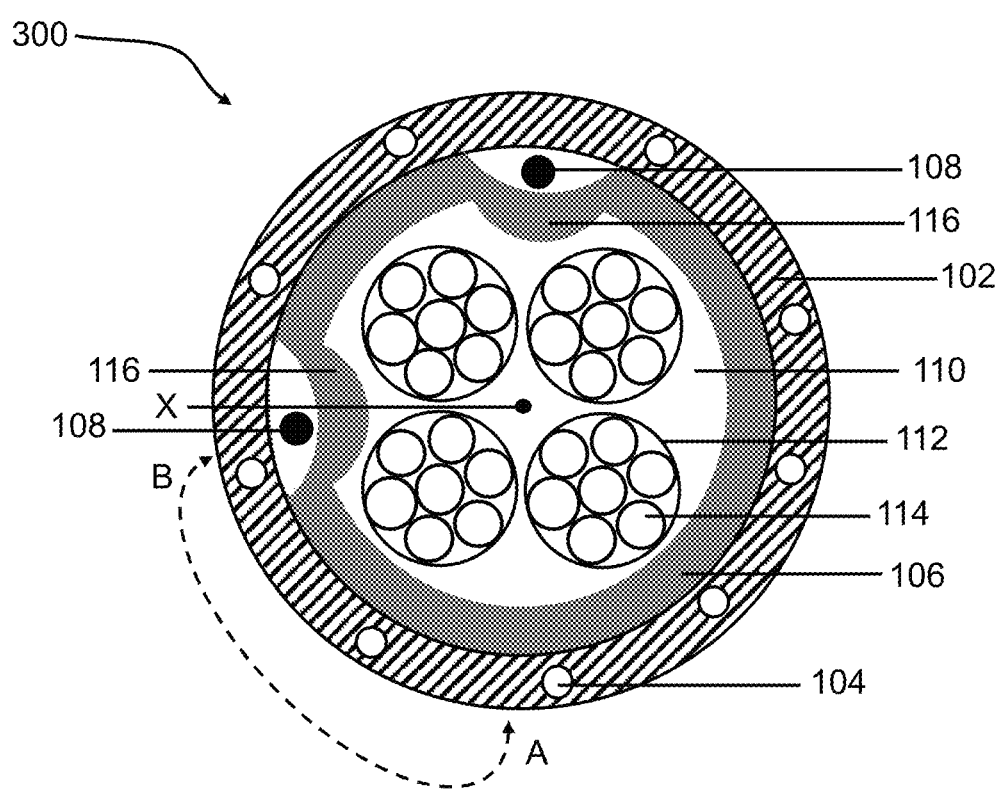
FIG. 3 illustrates an exemplary optical fiber cable with two movable rip cords, wherein one rip cord is moved from its initial position.

Now, simultaneous reference is made to FIG. 1 through FIG. 3, in which FIG. 1 illustrates an exemplary optical fiber cable 100 with a movable rip cord, FIG. 2 illustrates an exemplary optical fiber cable 200 with two movable rip cords that are 180 degrees apart and FIG. 3 illustrates an exemplary optical fiber cable with two movable rip cords, wherein one rip cord is moved from its initial position.

The optical fiber cable 100, 200, 300 may include a core 110 having one or more optical transmission elements (i.e., optical fibers) 114, a first layer 106, a second layer 102 embedding one or more strength members 104 and one or more rip cords 108.

The one or more optical transmission elements may be present in form of, but not limited to, a group of loose optical fibers, a group of optical fiber ribbons or a stack of optical fiber ribbons, a group of rollable ribbons, a group of corrugated ribbons, a group of partially bonded optical fiber ribbons, a group of flat ribbons. Generally, an optical fiber refers to a medium associated with transmission of information over long distances in the form of light pulses. The optical fiber uses light to transmit voice and data communications over long distances when encapsulated in a jacket/sheath. The optical fiber may be of ITU.T G.657.A2 category. Alternatively, the optical fiber may be of ITU.T G.657.A1 or G.657.B3 or G.652.D or another suitable category. The ITU.T, stands for International Telecommunication Union-Telecommunication Standardization Sector, is one of the three sectors of the ITU. The ITU is the United Nations specialized agency in the field of telecommunications and is responsible for studying technical, operating and tariff questions and issuing recommendations on them with a view to standardizing telecommunications on a worldwide basis.

The optical fiber may be a bend insensitive fiber that has less degradation in optical properties or less increment in optical attenuation during bending of the optical fiber cable. Thus, the bend insensitive fiber further helps to maintain the optical properties during multiple winding/unwinding operations of the optical fiber cable. The optical fibers may be coloured fiber. The optical fiber may be a single-core optical fiber, a multi-core optical fiber, a single-mode optical fiber, a multimode optical fiber or the like. The single mode optical fiber carries only a single mode of light, and the multimode optical fiber carries multiple modes of light to propagate. The multicore optical fibers comprise of multiple cores as opposed to the single-core optical fiber that comprise only a single core.

A core of the optical fiber cable may be a uni-tube/monotube design comprised of a single buffer tube or loose tube carrying the one or more optical transmission elements. Alternatively, a core of the optical fiber cable may be a multitube design comprised of two or more buffer tubes or loose tubes carrying the optical transmission elements. A buffer tube is used in an optical fiber cable to provide mechanical isolation and protection to the optical fibers from physical damages. Alternatively, the core may comprise a plurality of optical fiber ribbon bundles, wherein an optical fiber ribbon bundle is a group of a plurality of optical fiber ribbons arranged/grouped together using one or more binders. The optical fiber ribbon includes a number of optical fibers arranged together using a matrix material. Multiple individual optical fiber ribbons are stacked or grouped into a bundle to form the optical fiber ribbon bundle. Furthermore, a partially bonded optical fiber ribbon from the group of intermittently bonded optical fiber ribbons is formed by intermittently bonding the plurality of optical fibers with the matrix material that imparts a bending and rolling capability along a width of the partially bonded optical fiber ribbon.

Referring to FIG. 1, FIG. 2 and FIG. 3, the one or more optical transmission elements 114 may be encapsulated in one or more buffer tubes (or one or more binders wherever applicable) 112 in the core 110. The one or more buffer tubes 112 may be made up of, but not limited to, PBT (polybutylene terephthalate), polypropylene (PP), polyamide, thermoplastic material or a combination of any of suitable material. Alternatively, the one or more optical transmission elements 114 may be provided in the form of one or more optical fiber ribbon(s)bundled using the or one or more binders 112 in the core 110 as explained above.

The core 110 may be surrounded by the first layer 106. The first layer 106 may be a flexible layer composed of water blocking tape (WBT), aramid yarns, glass roving yarns, water swellable yarns, or any other suitable material facilitating longitudinal water ingression prevention. The first layer 106 may be defined by a first shore D hardness of less than or equal to 20. Alternatively, the first shore D hardness may vary. The first layer 106 may be deformed (deformation is represented with reference numeral 116) radially towards a central axis (X), which is in a longitudinal direction of the optical fiber cable (as shown in FIG. 1, FIG. 2 and FIG. 3).

The first layer 106 may be surrounded by the second layer 102. The second layer 102 is relatively harder than the first layer 106. The second layer 102 may be defined by a second shore D hardness of greater than or equal to 40. Alternatively, the second shore D hardness may vary. The second layer 102 may be a jacket or a sheath. Usually, sheathing (extrusion) is done at a high temperature (preferably more than 100° C.). The sheathing is a process of squeezing a molten sheathing material through a funnel of a die as the core runs through the center. The sheathing material for the sheath may include, but not limited to, polyvinylchloride, polyethylene (such as High Density Poly Ethylene (HDPE), Medium Density Poly Ethylene, and Low Density Poly Ethylene), polyurethane, thermoplastic rubber/elastomer, thermoplastic chlorinated polyethylene or combination thereof. Alternatively, the second layer 102 may be a steel tape layer, ECCS (Electro Chrome Coated Steel) tape layer or any other suitable layer.

The second layer 102 may comprise the one or more strength members 104 embedded in it, wherein the one or more strength members 104 may provide mechanical strength and stiffness to the optical fiber cable. The one or more strength members 104 may provide enhanced break load and excellent crush protection/resistance performance. The crush resistance is an ability of a cable to withstand and/or recover from the effects of a compressive force. The one or more strength members 104 may be made of, but not limited to, FRP (Fiber Reinforced Plastic), ARP (Aramid Reinforced Plastic) or any other suitable dielectric/strength material. The one or more strength members 104 may have a round shape, a flat shape or any other suitable shape. The one or more strength members 104 may be coated with EAA (Ethylene Acrylic Acid) or EVA (Ethylene-Vinyl Acetate) coating for better adhesion with the second layer 102, i.e., to enhance the adhesion of the one or more strength members 104 with the second layer 102. Alternatively, the second layer 102 may not comprise the embedded strength members. Alternatively, the one or more strength members 104 may be placed in the center of the optical fiber cable (i.e., in the core 110), thus, may be referred to as a central strength member.

The one or more rip cords 108 may be placed between the first layer 106 and the second layer 102 such that the one or more ripcords 108 has a degree of angular movement ($D_f$) less than ±d, wherein d is angular distance between two consecutive rip cords of the optical fiber cable. Such angular movement of the one or more ripcords 108 is shown in FIG. 3. As mentioned previously, the first layer 106 may be deformed radially towards the central axis (X). The first layer 106 may be deformed in the vicinity of the one or more rip cords 108, where deformation 116 of the first layer is equal to or greater than a diameter of the one or more rip cords 108. In other words, the one or more rip cords 108 may cause deformation 116 of the first layer 106 towards the centre of the optical fiber cable which is equal to or greater than the diameter of the one or more rip cords 108. In an example, in case of the WBT as the first layer 106, the WBT is bent, from the place where the one or more rip cords 108 are present, towards the core 110. If the one or more rip cords 108 move to another position (i.e., from Position A to Position B as depicted by an arrow), the deformation 116 may also shift to the new position (i.e., from Position A to Position B) as shown in FIG. 3. In such a case, the previous deformation (Position A) may get back to its original/normal condition.

A force required for the angular movement of the one or more rip cords 108 may be less than 5 N. Alternatively, the force required for the angular movement of the one or more rip cords 108 may vary. The one or more rip cords 108 may have the angular movement of less than 180° in/for 1 meter of the optical fiber cable. Alternatively, the one or more rip cords 108 may have the angular movement of less than 45° in/for 1 meter of the optical fiber cable. Alternatively, the angular movement may vary. The one or more rip cords 108 may be movable in clockwise and anti-clockwise direction.

The one or more rip cords 108 may be made of nylon, polyester, aramid yarns or any other suitable material and may have a flat shape, monochord, cabled structure or any other suitable structure depending upon the requirement of the optical fiber cable. Further, the one or more rip cords 108 may have a denier of 2000 to 4000. Alternatively, the denier may vary. Typically, denier is the weight of yarn mass in grams and is measured by weighing 9,000 meters of yarn.

Further, the one or more rip cords 108 may have elongation at break between 15% to 30%, a breaking load of at least 10 Kgf (kilogram-force) and a number of plies up to 4. A ply is the number of yarns that are twisted around one another to create one single thread/cord. The one or more rip cords 108 may be initially placed substantially 90° to 180° apart to each other (as shown in FIG. 2) in the optical fiber cable 200.

It will be apparent to those skilled in the art that other alternatives of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific aspect, method, and examples herein. The invention should therefore not be limited by the above described alternative, method, and examples, but by all aspects and methods within the scope of the invention. It is intended that the specification and examples be considered as exemplary, with the true scope of the invention being indicated by the claims.

Conditional language used herein, such as, among others, "can," "may," "might," "may," "e.g.," and the like, unless specifically stated otherwise, or otherwise understood within the context as used, is generally intended to convey that certain alternatives include, while other alternatives do not include, certain features, elements and/or steps. Thus, such conditional language is not generally intended to imply that features, elements and/or steps are in any way required for one or more alternatives or that one or more alternatives necessarily include logic for deciding, with or without other input or prompting, whether these features, elements and/or steps are included or are to be performed in any particular alternative. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain alternatives require at least one of X, at least one of Y, or at least one of Z to each be present.

While the detailed description has shown, described, and pointed out novel features as applied to various alternatives, it can be understood that various omissions, substitutions, and changes in the form and details of the devices or algorithms illustrated can be made without departing from the scope of the disclosure. As can be recognized, certain alternatives described herein can be embodied within a form that does not provide all of the features and benefits set forth herein, as some features can be used or practiced separately from others.

We claim:

1. An optical fiber cable (100, 200, 300), comprising:
   a core (110) having one or more optical transmission elements (114);
   a first layer (106) surrounding the core (110);
   a second layer (102) surrounding the first layer (106), wherein the second layer (102) is relatively harder than the first layer (106); and
   one or more ripcords (108) placed between the first layer (106) and the second layer (102) such that the one or more ripcords (108) have a degree of angular movement ($D_f$) less than ±d, wherein d is an angular distance between two consecutive rip cords of the optical fiber cable and wherein the one or more rip cords (108) have the angular movement of less than 180° in 1 meter of the optical fiber cable (100, 200, 300).

2. The optical fiber cable (100, 200, 300) as claimed in claim 1, wherein a force required for the angular movement of the one or more ripcords (108) is less than 5 N.

3. The optical fiber cable (100, 200, 300) as claimed in claim 1, wherein the first layer (106) is defined by a first shore D hardness of less than or equal to 20.

4. The optical fiber cable (100, 200, 300) as claimed in claim 1, wherein the second layer (102) is defined by a second shore D hardness of greater than or equal to 40.

5. The optical fiber cable (100, 200, 300) as claimed in claim 1, wherein the one or more rip cords (108) have the angular movement of less than 45° in 1 meter of the optical fiber cable.

6. The optical fiber cable (100, 200, 300) as claimed in claim 1, wherein the first layer (106) is deformed radially towards a central axis (X) of the optical fiber cable, wherein the first layer (106) is deformed in vicinity of the one or more rip cords (108).

7. The optical fiber cable (100, 200, 300) as claimed in claim 6, wherein deformation (116) of the first layer (106) is equal to or greater than a diameter of the one or more rip cords (108).

8. The optical fiber cable (100, 200, 300) as claimed in claim 1 further comprises one or more strength members (104) embedded in the second layer (102).

* * * * *